No. 625,927. Patented May 30, 1899.
F. HANSON & A. W. REINNHOLM.
WOOD HOLDER AND CARRIER.
(Application filed Apr. 26, 1899.)

(No Model.)

Witnesses:
Lauritz N. Möller
Samuel J. Craddock

Inventors.
Ferdinand Hanson,
and August W. Reinnholm.
by their atty.

UNITED STATES PATENT OFFICE.

FERDINAND HANSON AND AUGUST W. REINNHOLM, OF ROCKPORT, MASSACHUSETTS.

WOOD HOLDER AND CARRIER.

SPECIFICATION forming part of Letters Patent No. 625,927, dated May 30, 1899.

Application filed April 26, 1899. Serial No. 714,577. (No model.)

*To all whom it may concern:*

Be it known that we, FERDINAND HANSON and AUGUST W. REINNHOLM, citizens of the United States, residing at Rockport, in the county of Essex and State of Massachusetts, have invented new and useful Improvements in Wood Holders and Carriers, of which the following is a specification.

This invention relates to improvements in wood holders and carriers for the purpose of carrying and holding fire-wood used in stoves, open fireplaces, &c.; and it has for its object to prevent dust, bark, shavings, chips, &c., from dropping onto the floor when the holder or carrier is loaded with wood, as will hereinafter be more fully shown and described, reference being had to the accompanying drawings, wherein—

Figure 1:
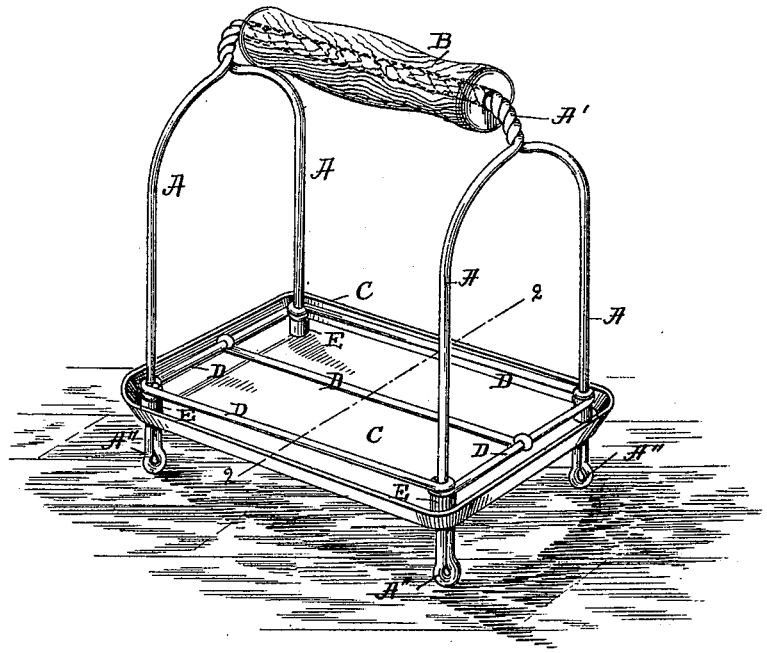
Figures 2, 3:
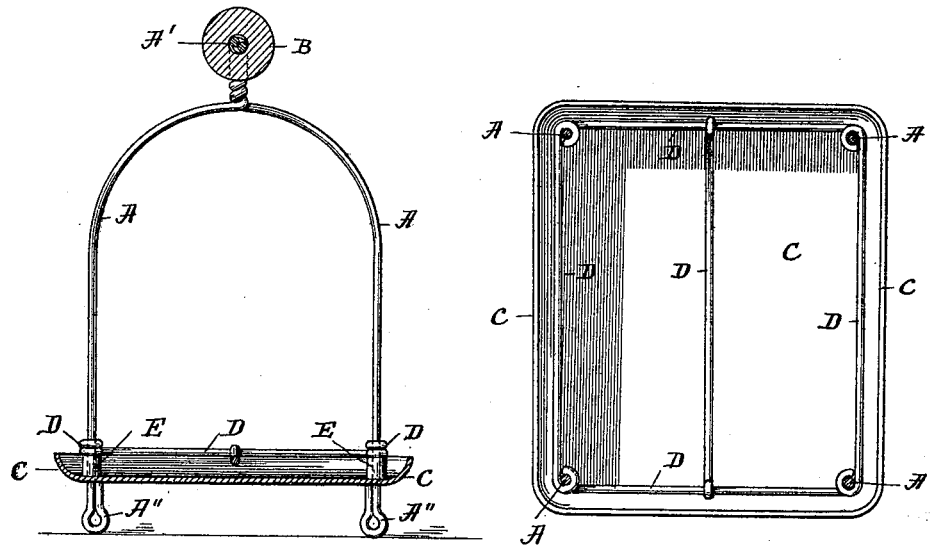

Figure 1 represents a perspective view of the invention. Fig. 2 represents a cross-section on the line 2 2 shown in Fig. 1, and Fig. 3 represents a top plan view showing the bails and handle removed.

Similar letters refer to similar parts wherever they occur on the different parts of the drawings.

The improved wood holder and carrier is made of metal wire and composed of bent-wire end bails A A, the upper ends of which are preferably twisted together to form a cross-bar A', on which is placed a handle B, which is preferably made of wood, as shown in Figs. 1 and 2. The lower ends of the bails A A project through perforations in a flanged pan C and are preferably bent upwardly, so as to form feet A" A", serving as a support for the pan C, as shown.

Above the pan C is attached to the bail portions A A a grate D, made of metal wire, and such grate serves as a support for the wood when placed in the holder or carrier. Said grate is shown as raised slightly above the bottom of the pan C, there being left a space between the under side of said grate and the interior upper surface of said pan, so as to enable chips, bark, shavings, dirt, &c., that may drop from the wood to be retained in the pan C, located below such grate.

In practice we arrange on the lower bail portions sleeves or thimbles E E, (shown in Figs. 1 and 2,) which serve as supports for the wire grating D D, so as to keep the latter properly elevated above the flanged or rimmed pan C, as shown in Figs. 1 and 2.

The bails A A may be made from two or more wires properly united together in any suitable manner, and the wire grating may be made from a single piece or two or more pieces properly attached together, as may be found most practical and convenient, without departing from the essence of our invention.

The invention is very simple in construction and is very light, strong, and portable. It can be manufactured at a very slight expense, and it serves as a practical device for carrying or holding fire-wood and preventing chips, bark, dirt, &c., from dropping onto the floor, stairs, &c., of a room or house, as hereinbefore fully set forth and described.

What we wish to secure by Letters Patent and claim is—

The herein-described wood holder or carrier made of metal wire, and composed of wire bails A, A, having an upper cross-bar A' provided with a handle, and having their lower ends attached to a pan C, combined with a wire grating D attached to said bail portions, and arranged above said pan, substantially as and for the purpose set forth.

In testimony whereof we have hereunto set our hands in presence of two subscribing witnesses.

FERDINAND HANSON.
AUGUST W. REINNHOLM.

Witnesses:
ALBAN ANDRÉN,
LAURITZ N. MÖLLER.